United States Patent
DiRisio

(10) Patent No.: US 6,301,445 B1
(45) Date of Patent: Oct. 9, 2001

(54) DUAL WHEEL EXPOSURE COUNTER

(75) Inventor: Anthony DiRisio, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/526,146

(22) Filed: Mar. 15, 2000

(51) Int. Cl.[7] .................................................. G03B 1/66
(52) U.S. Cl. .................................... 396/284; 396/411
(58) Field of Search ............................... 396/6, 281, 284, 396/411

(56) References Cited

U.S. PATENT DOCUMENTS

| | | |
|---|---|---|
| 1,642,818 | 9/1927 | Lessler et al. . |
| 1,888,134 | 11/1932 | Kunkler . |
| 3,057,277 | 10/1962 | Swarofsky et al. . |
| 3,404,614 | 10/1968 | Naumann . |
| 5,809,351 * | 9/1998 | Albrecht ................................ 396/284 |

\* cited by examiner

Primary Examiner—Russell Adams
Assistant Examiner—Arthur A Smith
(74) Attorney, Agent, or Firm—Roger A. Fields

(57) ABSTRACT

A dual wheel exposure counter comprising a rotatable tenths counter wheel having a series of at least two spaced units, and a rotatable unit counter wheel having a series of ten spaced units and a rotating member which rotates the tenths counter wheel to change by one unit when the unit counter wheel is rotated to change by ten units, is characterized in that a retaining member engages the tenths counter wheel to prevent rotation of the tenths counter wheel and can be moved temporarily out of engagement with the tenths counter wheel to permit the tenths counter wheel to be rotated to change by one unit, and the unit counter wheel includes an actuating member separate from the rotating member that moves the retaining member temporarily out of engagement with the tenths counter wheel when the unit counter is rotated to change by ten units, whereby the rotating member can then rotate the tenths counter wheel to change by one unit.

11 Claims, 5 Drawing Sheets

DUAL WHEEL EXPOSURE COUNTER

FIELD OF THE INVENTION

The invention relates generally to the field of photography, and in particular to a dual wheel type of exposure counter for a camera.

BACKGROUND OF THE INVENTION

Practically every camera that is available today includes an exposure counter. The exposure counter provides a visible indication of the number of film frames that remain available to be exposed on a filmstrip in the camera, i.e. the current number of exposures that can be made on the filmstrip. Alternatively, the exposure counter can provide a visible indication of the number of film frames actually exposed on the filmstrip, i.e. the number of exposures already made. In either case, the exposure counter includes a numerical scale of successive exposure count indicia that are evenly spaced from one another. The scale of indicia at least range from the number "1" which indicates either that only one frame remains available to be exposed on the filmstrip, or only one frame has been actually exposed, to a higher number which is the maximum number of exposures, for example "15", "24" or "40". Each time the filmstrip is advanced one frame increment, the exposure counter undergoes an indicia change equivalent to one frame, which can be one less or one more than the previous number.

Early prior art U.S. Pat. No. 1,642,818 issued Sep. 20, 1927 discloses a dual wheel type of exposure counter comprising a count-by-unit counter wheel having ten evenly spaced units and a single actuating pawl, and a count-by-tenths counter wheel having ten evenly spaced units which are the same as the ten units of the unit counter wheel and respective peripheral teeth which correspond to the ten units of the tenths counter wheel. The actuating pawl on the unit counter wheel successively engages the peripheral teeth on the tenths counter wheel to rotate the tenths counter wheel to change by one unit in response to each rotation of the unit counter wheel to change by ten units. The ten units on the unit counter wheel and the ten units on the tenths counter wheel are designated "0", "1", "2", "3", "4", "5", "6", "7", "8", "9" on respective top sides of the two counter wheels. The unit counter wheel is incrementally rotated ten times to move the designations "1", "2", "3", "4", "5", "6", "7", "8", "9", "0" on the unit counter wheel successively into and out of a counter window in the housing of the camera. When the designation "0" on the unit counter wheel is moved into the counter window, following movement of the designation "9" on the unit wheel out of the counter window, the actuating pawl on the unit counter wheel engages one of the peripheral teeth on the tenths counter wheel to incrementally rotate the tenths counter wheel to move one of the designations "0", "1", "2", "3", "4", "5", "6", "7", "8" "9" on the tenths counter wheel out of the counter window and move the next higher designation on the tenths counter wheel into the counter window. This can provide a frame count from "01" to "99", which is particularly useful when a relatively long length of film is used in the camera. However, a possible problem is that the engagement of the actuating pawl on the unit counter wheel with any one of the peripheral teeth on the tenths counter wheel is momentary, rather than continuous. Consequently, when the actuating pawl is not engaged with one of the peripheral teeth, a mechanical shock to the exposure counter, for example should the camera be dropped, could move the tenths counter wheel to be out of count.

Later prior art U.S. Pat. No. 5,809,351 issued Sep. 15, 1998 discloses a dual wheel exposure counter comprising a tenths counter wheel having a series of six evenly spaced units and six evenly spaced actuated members, and a unit counter wheel having a series of ten evenly spaced units and a single actuating member which successively actuates the actuated members to rotate the tenths counter wheel to change by one unit in response to each rotation of the unit counter wheel to change by ten units. The six units on the tenths counter wheel are designated "5", "4", "3", "2", "1", "0", and the ten units on the units counter wheel are designated "9", "8", "7", "6", "5", "4", "3", "2", "1", "0". The unit counter wheel includes an opposed-end concentric channel having an opening between opposite ends of the channel. The single actuating member of the unit counter wheel constitutes a protuberance which is positioned in the opening to leave respective ingress and egress spaces in the opening between the protuberance and the opposite ends of the channel. The actuated members are positioned on the tenths counter wheel for the protuberance to drive one of the actuated members out of the channel through the egress space to rotate the tenths counter wheel to change by one unit and move another of the actuated members into the channel through the ingress space, each time the unit counter wheel is rotated to change by ten units. The fact that one of the actuating members is always in the channel serves to prevent any unintended rotation of the tenths counter wheel with respect to the unit counter wheel.

SUMMARY OF THE INVENTION

According to one aspect of the invention, a dual wheel exposure counter comprising a rotatable tenths counter wheel having a series of at least two spaced units, and a rotatable unit counter wheel having a series of ten spaced units and a rotating member which rotates the tenths counter wheel to change by one unit when the unit counter wheel is rotated to change by ten units, is characterized in that:

a retaining member engages the tenths counter wheel to prevent rotation of the tenths counter wheel and can be moved temporarily out of engagement with the tenths counter wheel to permit the tenths counter wheel to be rotated to change by one unit; and the unit counter wheel includes an actuating member separate from the rotating member that moves the retaining member temporarily out of engagement with the tenths counter wheel when the unit counter is rotated to change by ten units, whereby the rotating member can then rotate the tenths counter wheel to change by one unit.

According to another aspect of the invention, an exposure counting method for a dual wheel exposure counter comprising a rotatable tenths counter wheel having a series of at least two spaced units, and a rotatable unit counter wheel having a series of ten spaced units and which rotates the tenths counter wheel to change by one unit when the unit counter wheel is rotated to change by ten units, is characterized by the steps of:

elastically biasing a retaining member into engagement with the tenths counter wheel to prevent rotation of the tenths counter wheel when the unit counter wheel is rotated to change less than ten units; and moving the retaining member relative to the unit counter wheel to move the retaining member out of engagement with the tenths counter wheel when the unit counter wheel is rotated to change by ten units, to permit the unit counter wheel to then rotate the tenths counter wheel to change by one unit.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
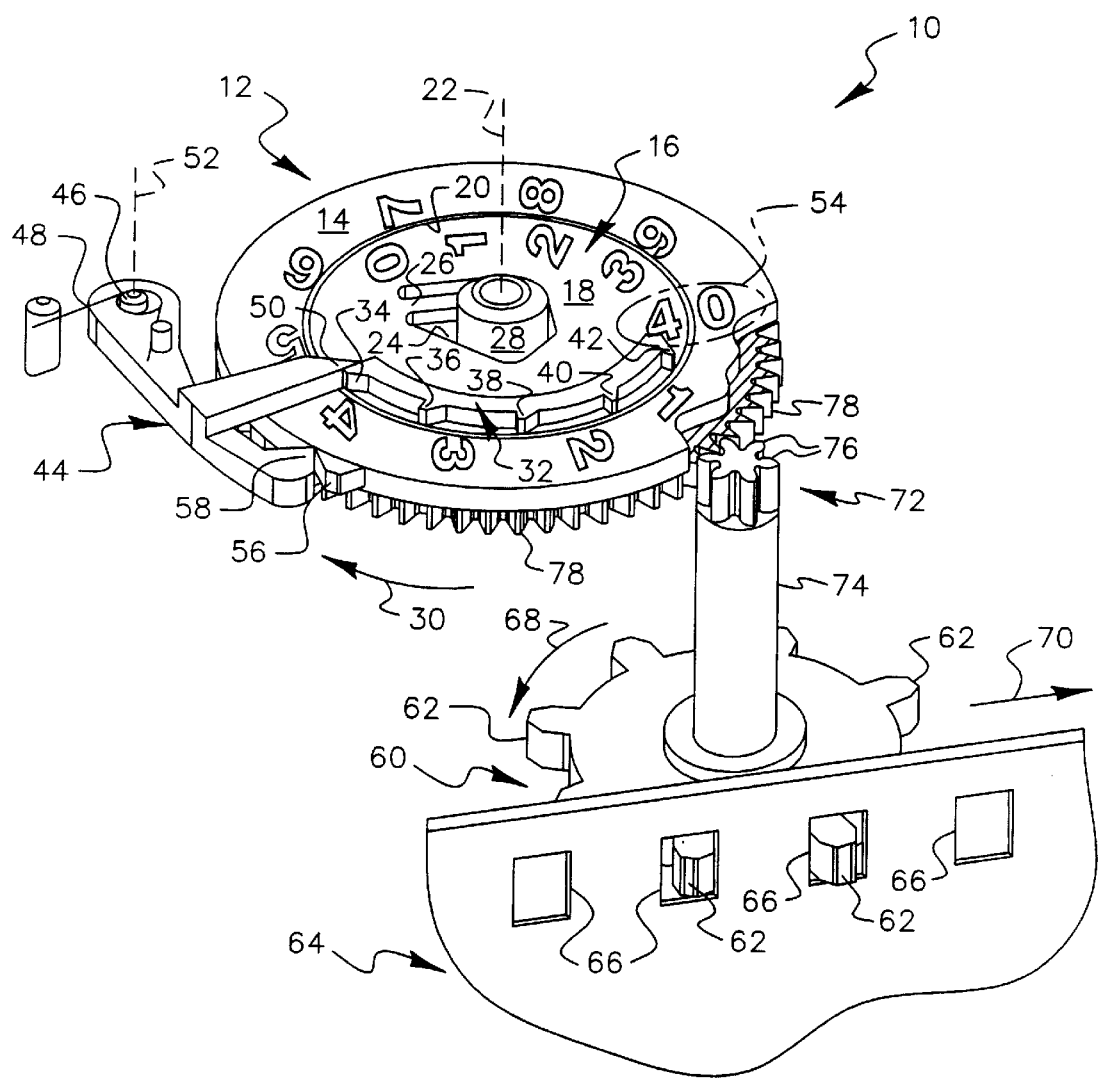
FIG. 1 is a perspective view of a dual wheel exposure counter which is a preferred embodiment of the invention.
Figure 2:
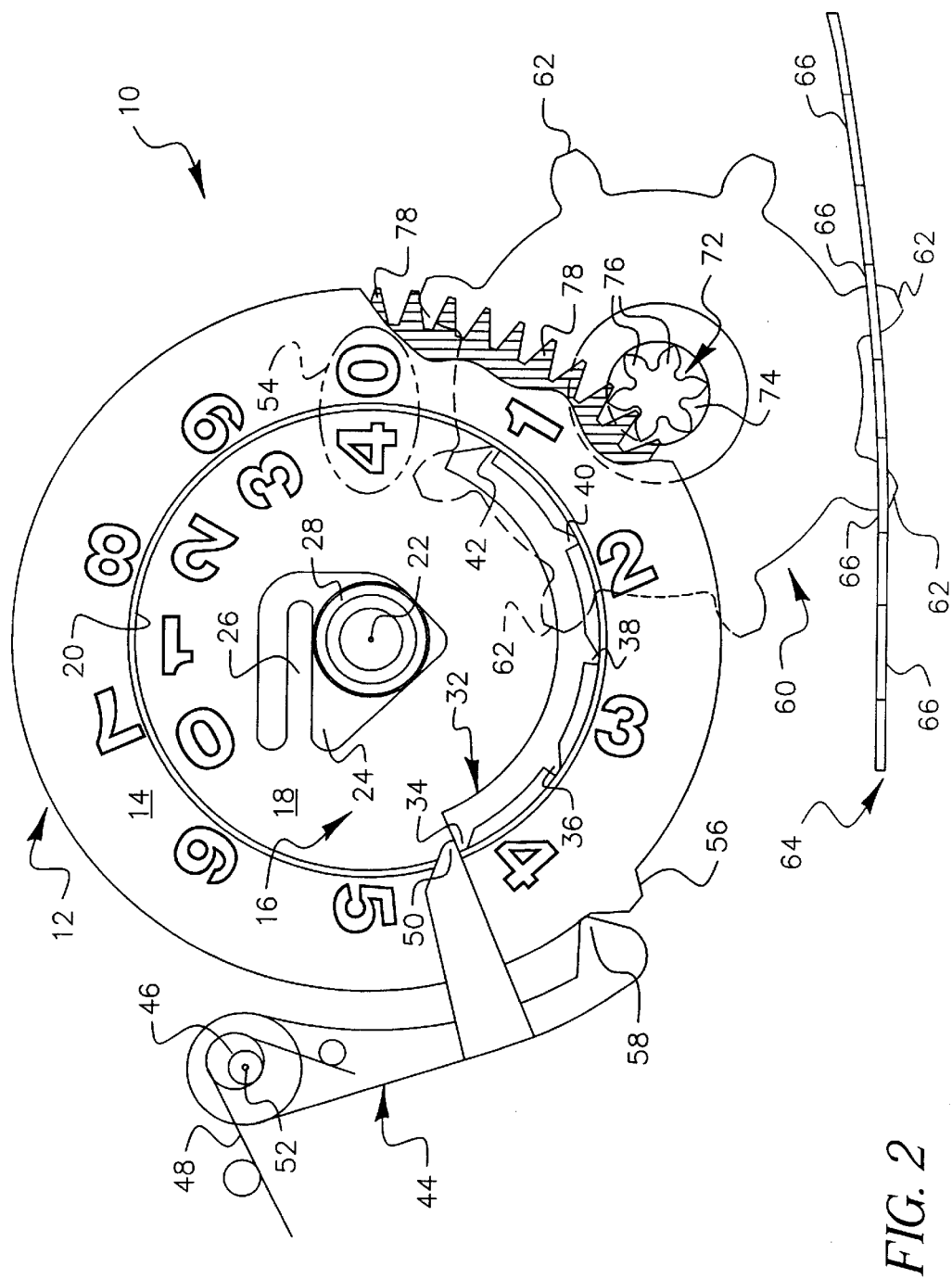
FIG. 2 is a top plan view of the dual wheel exposure counter as seen in FIG. 1.

Referring now to the drawings, FIGS. 1 and 2 depict a dual wheel exposure counter 10 preferably for use in a camera, not shown. The exposure counter 10 comprises a rotatable count-by-unit counter wheel 12 having a concentric series of ten evenly spaced consecutive units on its top side 14 and a rotatable count-by-tenths counter wheel 16 having a series of five evenly spaced consecutive units on its top side 18. The ten consecutive units on the top side 14 of the unit counter wheel 12 are designated "0", "9", "8", "7", "6", "5", "4", "3", "2", "1". The five consecutive units on the top side 18 of the tenths counter wheel 16 are designated "4", "3", "2", "1", "0".

The unit counter wheel 12 has a center (central) cavity 20, and the tenths counter wheel 16 is seated in the cavity to make the two counter wheels have the same axis of rotation 22. Thus, the unit wheel 12 and the tenths counter wheel 16 are concentric. See FIGS. 1 and 2.

The tenths counter wheel 16 has a center (central) opening 24 and an integral elastic cantilever beam 26 that projects into the center opening. The unit counter wheel 12 has an integral center rotation post 28 that projects into the center opening 24 in the tenths counter wheel 16. The elastic beam 26 presses against the rotation post 28 with a sufficient friction force to make the tenths counter wheel 16 rotate with the unit counter wheel 12 in a clockwise direction 30 in FIGS. 1 and 2 when the tenths counter wheel is not prevented from being rotated in that direction. If the tenths counter wheel 16 is prevented from being rotated in the clockwise direction 30, the unit counter wheel 12 can rotate relative to the tenths counter wheel because the rotation post 28 will overcome the friction force the elastic beam 26 exerts against it. Thus, the combination of the elastic beam 26 and the rotation post 28 function as what is often referred to as a "friction or slip clutch".

Figure 4:
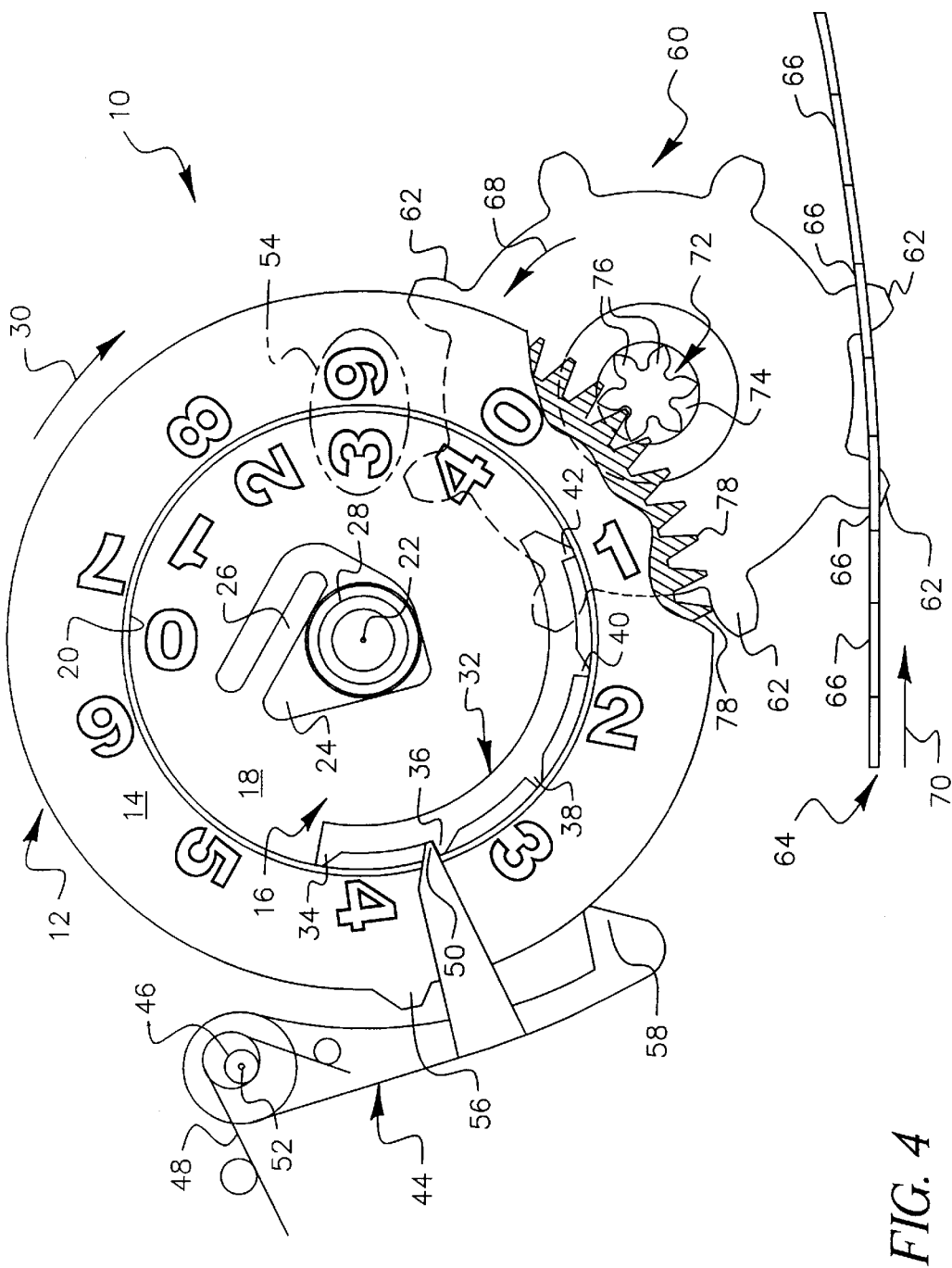
Figure 5:
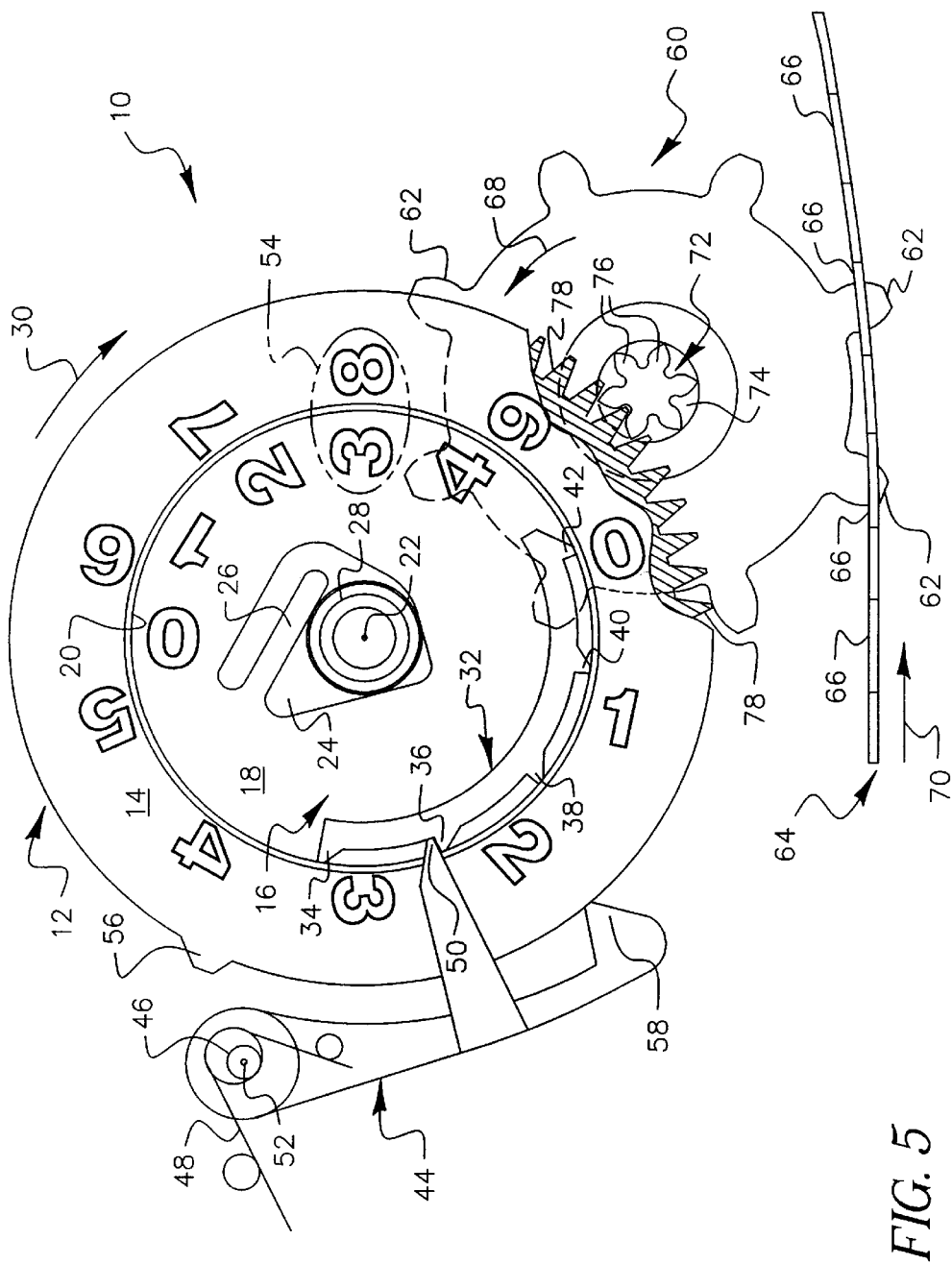

The tenths counter wheel 16 has an integral rib 32 on the top side 18 of the tenths counter wheel that is uniformly curved partially about the rotation post 28 on the unit counter wheel 12. Five evenly spaced stops 34, 36, 38, 40 and 42 corresponding to the five consecutive units "4", "3", "2", "1", "0" on the top side 18 of the tenths counter wheel 16 project from the rib 32 to be individually engaged to prevent rotation of the tenths counter wheel with the unit counter wheel 12 in the clockwise direction 30 in FIGS. 1 and 2. A retaining lever 44 is pivotally mounted on a support pin 46 to be urged via a torsion spring 48 to swing (pivot) a retaining finger 50 of the retaining lever against the rib 32, for the retaining finger to engage any one of the stops 34, 36, 38, 40 and 42 on the rib to prevent rotation of the tenths counter wheel 16 in the clockwise direction 30. The retaining member is pivotal about a pivot axis 52 that is parallel to the rotation axis 22 of the unit counter wheel 12 and the tenths counter wheel 16. When the retaining finger 50 is in engagement with any one of the stops 34, 36, 38, 40 and 42, a corresponding one of the five consecutive units "4", "3", "2", "1", "0" on the top side 18 of the tenths counter wheel 16 is visible in a known counter window 54 in a housing of the camera. For example, FIGS. 1 and 2 illustrate that when the retaining finger 50 is in engagement with the stop 34, the unit "4" of the tenths counter wheel 16 is visible in the counter window 54, and FIGS. 4 and 5 illustrate that when the retaining finger is in engagement with the stop 36, the unit "3" of the tenths counter wheel is visible in the counter window. At the same time, one of the ten consecutive units "0", "9", "8", "7", "6", "5", "4", "3", "2", "1" on the top side 14 of the unit counter wheel 12 is visible in the counter window 54 to the right of whichever one of the of the five consecutive units "4", "3", "2", "1", "0" of the tenths counter wheel 16 is visible in the counter window. Thus, FIGS. 1 and 2 show "40" in the counter window 54, FIG. 4 shows "39" in the counter window, and FIG. 5 shows "38" in the counter window.

Figure 3:
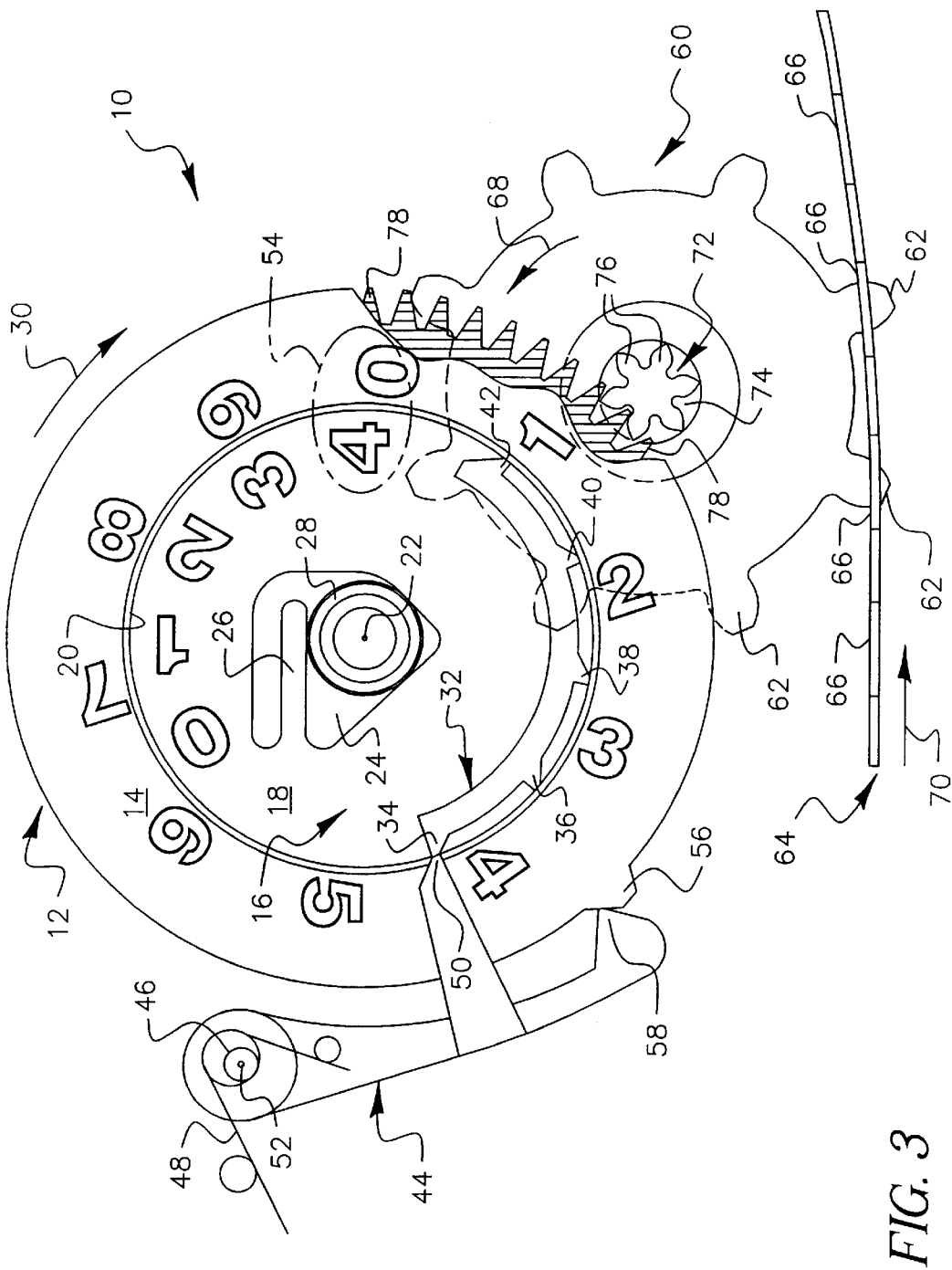
FIGS. 3–5 are top plan views of the dual wheel exposure counter illustrating its operation.

The unit counter wheel 12 has an integral peripheral actuating member 56 that is radially spaced from the rotation post 28 on the unit counter wheel. Each time the unit counter wheel 12 is rotated in the clockwise direction 30 as shown in FIGS. 3 and 4 to move the unit "0" on the top side 14 of the unit counter wheel out of the counter window 54 and move the unit "9" on the top side of the unit counter wheel into the counter window, the actuating member 56 pivots the retaining lever 44 beginning at a free end 58 of the retaining lever to swing the retaining finger 50 temporarily out of engagement with any one of the stops 34, 36, 38, 40 and 42 on the rib 32 on the top side 18 of the tenths counter wheel 16. This permits the tenths counter wheel 16 to be temporarily rotated with the unit counter wheel 12 in the clockwise direction 30 as shown in FIGS. 3 and 4, to move one of the units "4", "3", "2", "1", "0" on the top side 18 of the tenths counter wheel out of the counter window 54 and move the next lower unit into the counter window. When the actuating member 56 departs from the free end 58 of the retaining lever 44, the spring 48 returns the retaining finger 50 of the retaining lever to the rib 32. The tenths counter wheel 16 is prevented from rotating with the unit counter wheel 12 in the clockwise direction 30 when as shown in FIG. 4 the next one of the stops 34, 36, 38, 40 and 42 on the rib 32 is moved into engagement with the retaining finger 50.

A known sprocket wheel 60 has eight evenly spaced sprocket teeth 62 successively engageable with a known filmstrip 64 at respective evenly spaced perforations 66 in the filmstrip to rotate the sprocket wheel in a counter-clockwise direction 68 when the filmstrip is advanced a single frame increment in a film advance direction 70 as shown in FIGS. 3 and 4 and in FIG. 5, following each exposure of one frame of the filmstrip in the camera. A pinion 72 coaxially connected via a shaft 74 to the sprocket wheel 60 has successive evenly spaced teeth 76 that engage with respective evenly spaced teeth 78 of the unit counter wheel 12 to incrementally rotate the unit counter wheel in the clockwise direction 30 each time the filmstrip 64 is advanced in the film advance direction 70.

Operation

FIGS. 1 and 2 show the unit "4" on the tenths counter wheel 16 and the unit "0" on the unit counter wheel 12 side-by-side in the counter window 54, This indicates that forty frames on the filmstrip 64 are available for exposure in the camera.

After frame number "40" on the filmstrip 64 is exposed in the camera, the filmstrip is advanced a single frame increment in the film advance direction 70 as shown in FIGS. 3 and 4. The sprocket wheel 60 is rotated in the counter-clockwise direction 68 to similarly rotate the pinion 72, to in turn incrementally rotate the unit counter wheel 12 in the clockwise direction 30 in FIGS. 3 and 4.

When the unit counter wheel 12 is rotated in the clockwise direction 30 as shown in FIGS. 3 and 4, the unit "0" on the top side 14 of the unit counter wheel is moved out of the counter window 54 and the unit "9" on the top side of the unit counter wheel is moved into the counter window. The actuating member 56 on the unit counter wheel 12 pivots the retaining lever 44 beginning at the free end 58 of the retaining lever to swing the retaining finger 50 temporarily out of engagement with the stop 34 on the rib 32 on the top side 18 of the tenths counter wheel 16. This permits the tenths counter wheel 16 to be temporarily rotated with the unit counter wheel 12 in the clockwise direction 30 as shown in FIGS. 3 and 4, to move the unit "4" on the top side 18 of the tenths counter wheel out of the counter window 54 and move the next lower unit "3" into the counter window. When the actuating member 56 departs from the free end 58 of the retaining lever 44, the spring 48 returns the retaining finger 50 of the retaining lever to the rib 32. The tenths counter wheel 16 is prevented from rotating with the unit counter wheel 12 in the clockwise direction 30 when as shown in FIG. 4 the next stop 36 on the rib 32 is moved into engagement with the retaining finger 50. At this time, the filmstrip 64 has been advanced a single frame increment in the film advance direction 70 and therefore its movement is ended.

FIG. 4 shows the unit "3" on the tenths counter wheel 16 and the unit "9" on the unit counter wheel 12 side-by-side in the counter window 54, This indicates that thirty-nine frames on the filmstrip 64 are available for exposure in the camera.

Next, after frame number "39" on the filmstrip 64 is exposed in the camera, the filmstrip is advanced a single frame increment in the film advance direction 70 as shown in FIG. 5. The sprocket wheel 60 is rotated in the counter-clockwise direction 68 to similarly rotate the pinion 72, to in turn incrementally rotate the unit counter wheel 12 in the clockwise direction 30 in FIG. 5. Since the actuating member 56 on the unit counter wheel 12 is out of range to pivot the retaining lever 44 to swing the retaining finger 50 temporarily out of engagement with the stop 36 on the rib 32 on the top side 18 of the tenths counter wheel 16, the tenths counter wheel 16 is prevented from rotating with the unit counter wheel 12 in the clockwise direction 30 in FIG. 5. Thus, the unit "3" on the top side 18 of the tenths counter wheel 16 remains in the counter window 54, and the unit "9" on the top side 14 of the unit counter wheel 12 is replaced in the counter window with the next lower unit "8".

The invention has been described with reference to a preferred embodiment. However, it will be appreciated that variations and modifications can be effected by a person of ordinary skill in the art without departing from the scope of the invention. For example, instead of there being five consecutive units "4", "3", "2", "1", "0" on the top side 18 of the tenths counter wheel 16, there can be more or less unit.

Parts List 10. dual wheel exposure counter
12. unit counter wheel
14. top side
16. tenths counter wheel
18. top side
20. center cavity
22. rotation axis
24. center opening
26. elastic beam
28. rotation post
30. clockwise direction
32. rib
34. stop
36. stop
38. stop
40. stop
42. stop
44. retaining lever
46. support pin
48. torsion spring
50. retaining finger
52. pivot axis
54. counter window
56. actuating member
58. free end
60. sprocket wheel
62. sprocket teeth
64. filmstrip
66. perforations
68. counter-clockwise direction
70. film advance direction
72. pinion
74. shaft
76. teeth
78. teeth

What is claimed is:

1. A dual wheel exposure counter comprising a rotatable tenths counter wheel having a series of at least two spaced units, and a rotatable unit counter wheel having a series of ten spaced units and a rotating member which rotates said tenths counter wheel to change by one unit when said unit counter wheel is rotated to change by ten units, is characterized in that:

a retaining member engages said tenths counter wheel to prevent rotation of said tenths counter wheel and can be moved temporarily out of engagement with said tenths counter wheel to permit said tenths counter wheel to be rotated to change by one unit; and said unit counter wheel includes an actuating member separate from said rotating member that moves said retaining member temporarily out of engagement with said tenths counter wheel when said unit counter is rotated to change by ten units, whereby said rotating member can then rotate said tenths counter wheel to change by one unit.

2. A dual wheel exposure counter as recited in claim 1, wherein a spring urges said retaining member to move into engagement with said tenths counter wheel.

3. A dual wheel exposure counter as recited in claim 1, wherein said tenths counter wheel includes at least two spaced engageable members, and said retaining member is pivotable to engage with any one of said engageable members to prevent rotation of said tenths counter wheel.

4. A dual wheel exposure counter as recited in claim 1, wherein said rotating member is fixed to said unit counter wheel to continuously rotate with said unit counter wheel and is clutch coupled with said tenths counter wheel to rotate said tenths counter wheel when said unit counter wheel is rotated and said retaining member is temporarily out of engagement with said tenths counter wheel and to rotate without rotating said tenths unit counter wheel when said unit counter wheel is rotated and said retainer is engaged with said tenths counter wheel.

5. A dual wheel exposure counter as recited in claim 1, wherein said unit counter wheel and said tenths counter wheel have the same axis of rotation, and said rotating member is coaxially centered with respect to said unit counter wheel and said tenths counter wheel.

6. A dual wheel exposure counter as recited in claim 5, wherein said tenths counter wheel has a center opening and a friction inducing member in said center opening, and said rotating member is fixed to said unit counter wheel and projects into said center opening against said friction inducing member to rotate said tenths counter wheel when said unit counter wheel is rotated and said retaining member is temporarily out of engagement with said tenths counter wheel and to rotate without rotating said tenths unit counter wheel when said unit counter wheel is rotated and said retainer is engaged with said tenths counter wheel.

7. A dual wheel exposure counter as recited in claim 5, wherein said unit counter wheel has a center cavity, and said tenths counter wheel is seated in said center cavity.

8. A dual wheel exposure counter as recited in claim 5, wherein said rotating member is fixed to said unit counter wheel along said axis of rotation, and said actuating member is fixed to said unit counter wheel spaced from said axis of rotation.

9. A dual wheel exposure counter as recited in claim 1, wherein said tenths counter wheel includes a curved rib having at least two spaced engageable members that are engageable one at a time with said retaining member to individually prevent rotation of said tenths counter wheel.

10. A dual wheel exposure counter comprising a rotatable tenths counter wheel having a series of at least two spaced units, and a rotatable unit counter wheel having a series of ten spaced units and a rotating member which rotates said tenths counter wheel to change by one unit when said unit counter wheel is rotated to change by ten units, is characterized in that:

a retaining member is elastically biased to engage said tenths counter wheel to prevent rotation of said tenths counter wheel when said unit counter wheel is rotated to change less than ten units and is moved to disengage from said tenths counter wheel to permit said tenths counter wheel to be rotated to change by one unit when said unit counter wheel is rotated to change by ten units; and said unit counter wheel includes an actuating member that moves said retaining member relative to said unit counter wheel to disengage from said tenths counter wheel when said unit counter is rotated to change by ten units, whereby said rotating member can then rotate said tenths counter wheel to change by one unit.

11. An exposure counting method for a dual wheel exposure counter comprising a rotatable tenths counter wheel having a series of at least two spaced units, and a rotatable unit counter wheel having a series of ten spaced units and which rotates the tenths counter wheel to change by one unit when the unit counter wheel is rotated to change by ten units, is characterized by the steps of:

elastically biasing a retaining member into engagement with the tenths counter wheel to prevent rotation of the tenths counter wheel when the unit counter wheel is rotated to change less than ten units; and moving the retaining member relative to the unit counter wheel to move the retaining member out of engagement with the tenths counter wheel when the unit counter wheel is rotated to change by ten units, to permit the unit counter wheel to then rotate the tenths counter wheel to change by one unit.

\* \* \* \* \*